United States Patent Office 3,527,940
Patented Sept. 8, 1970

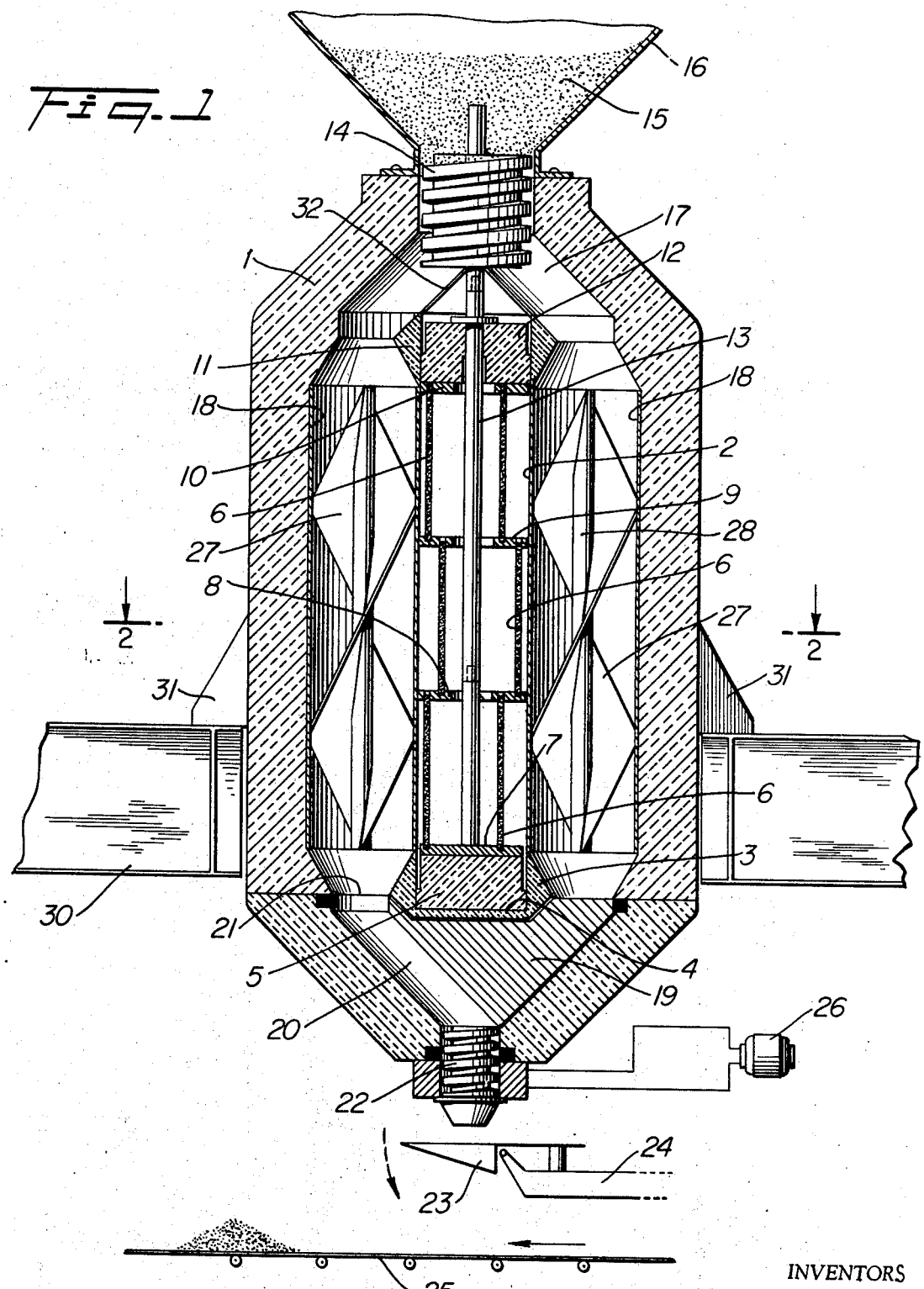

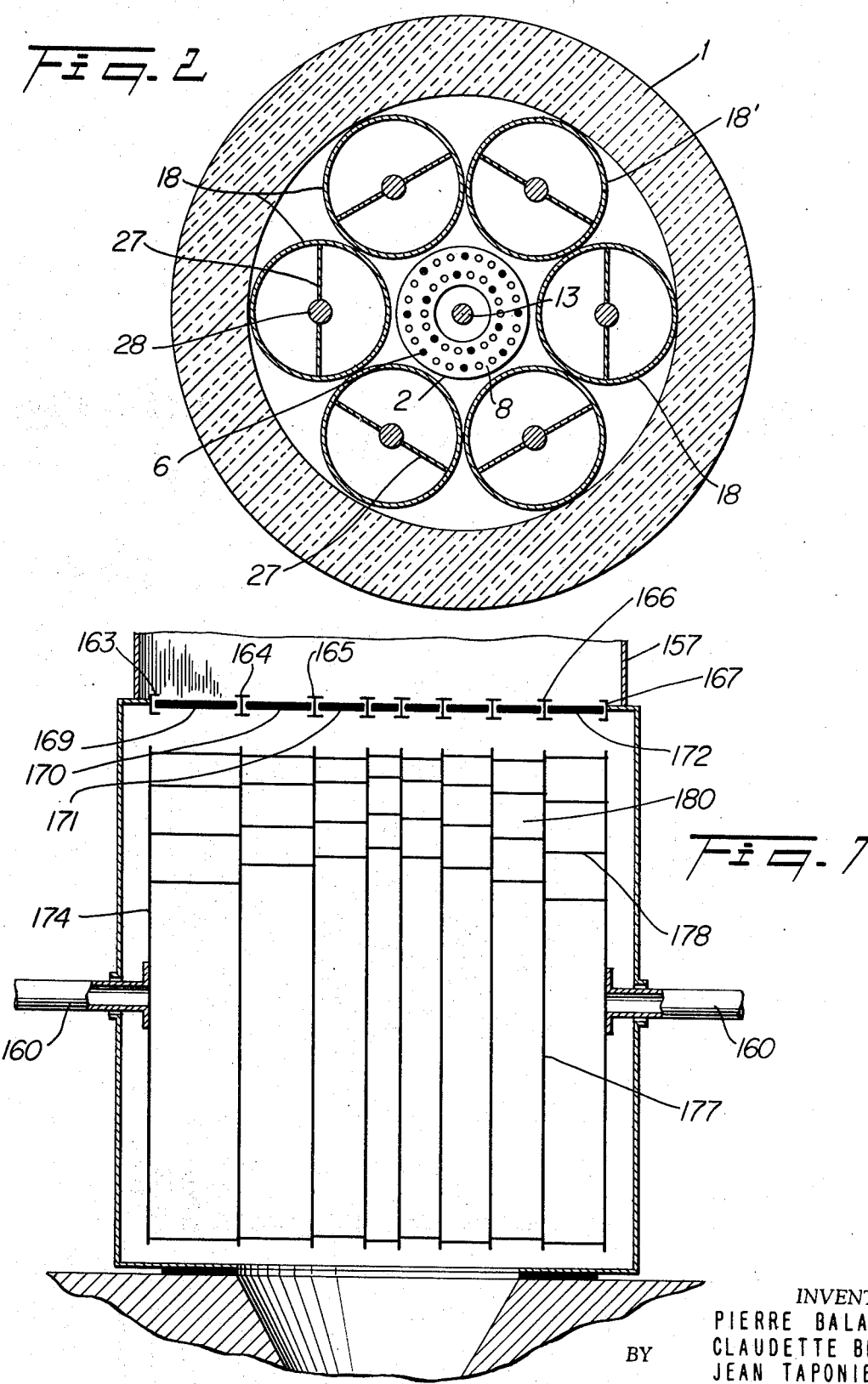

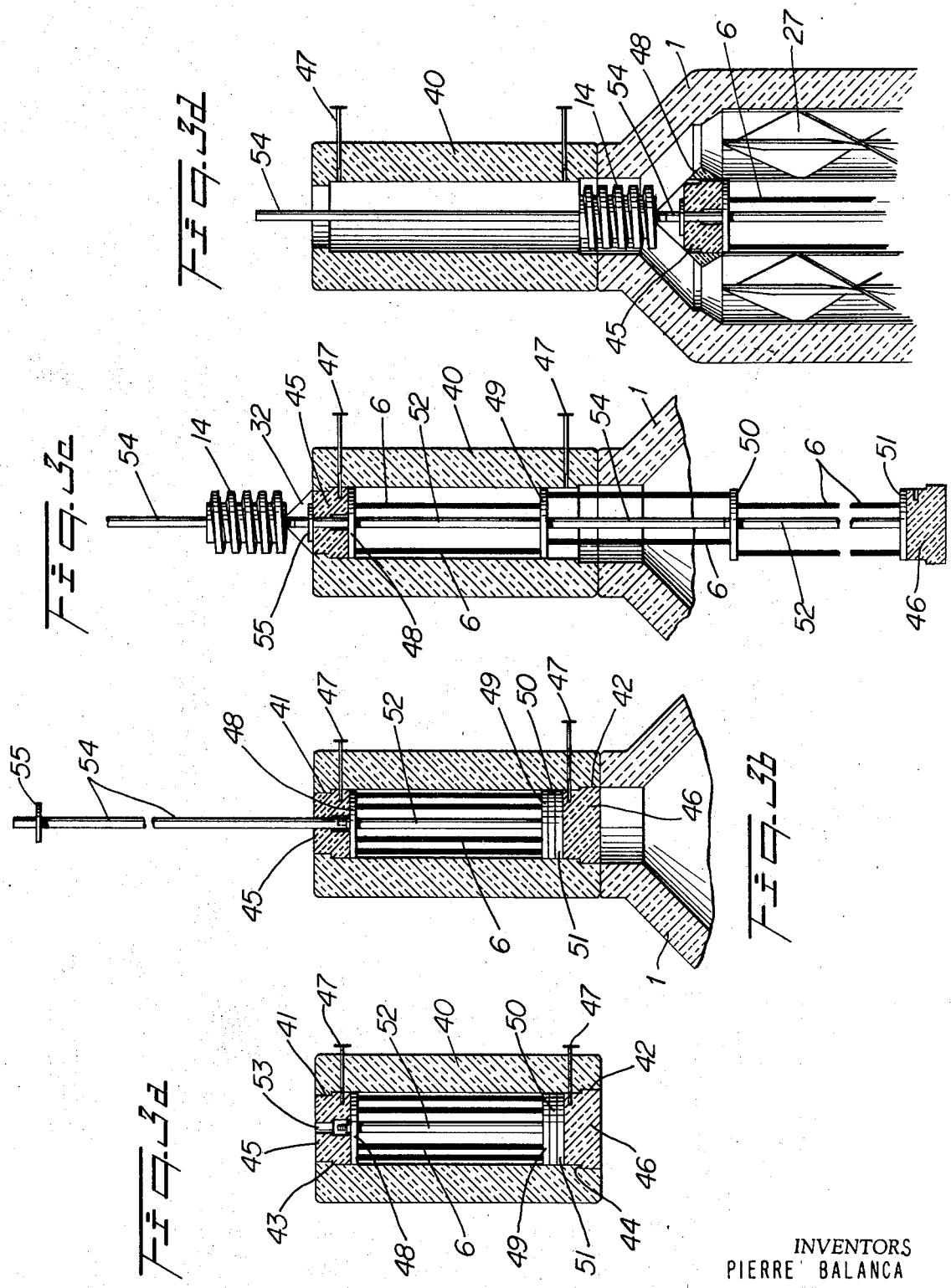

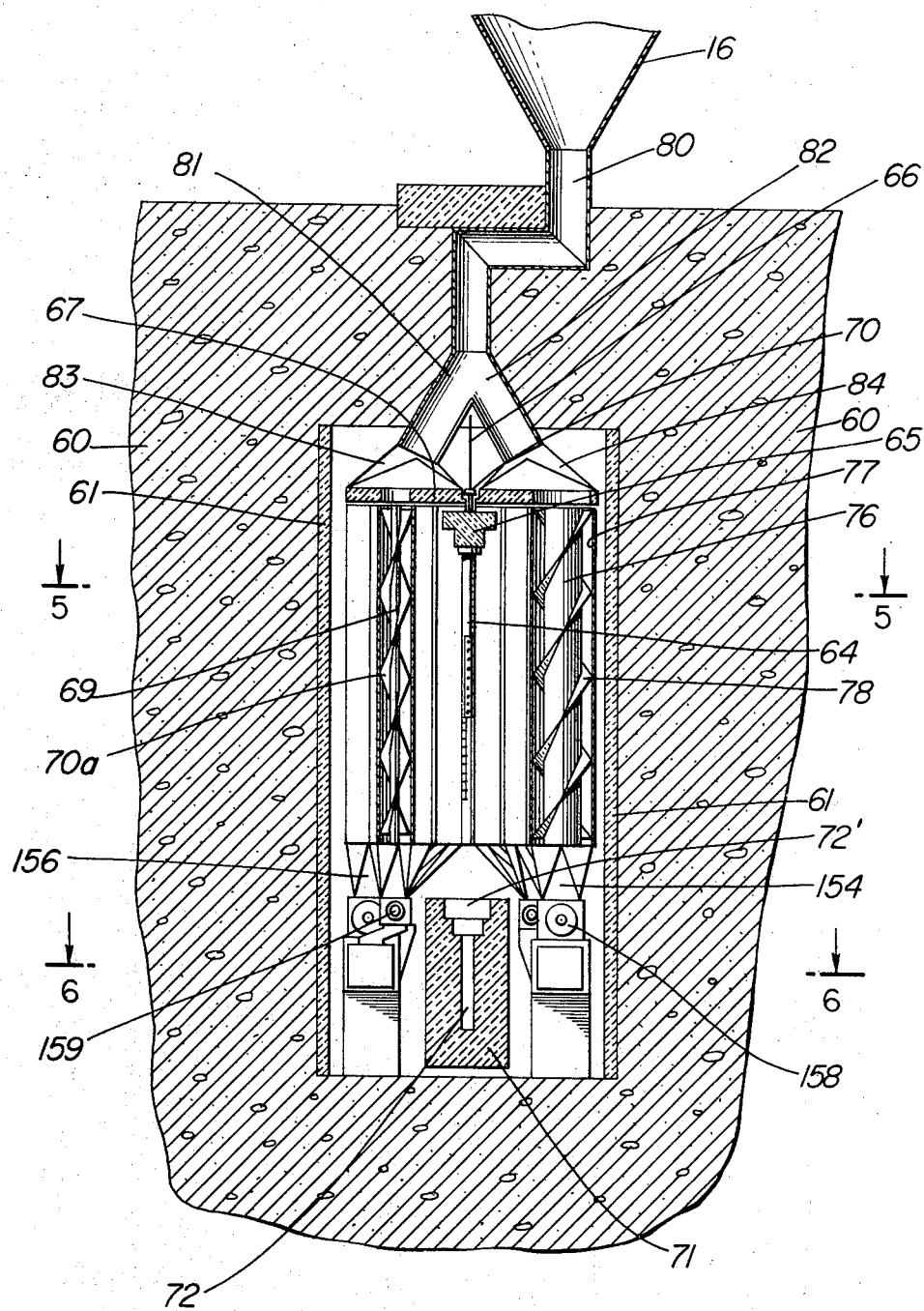

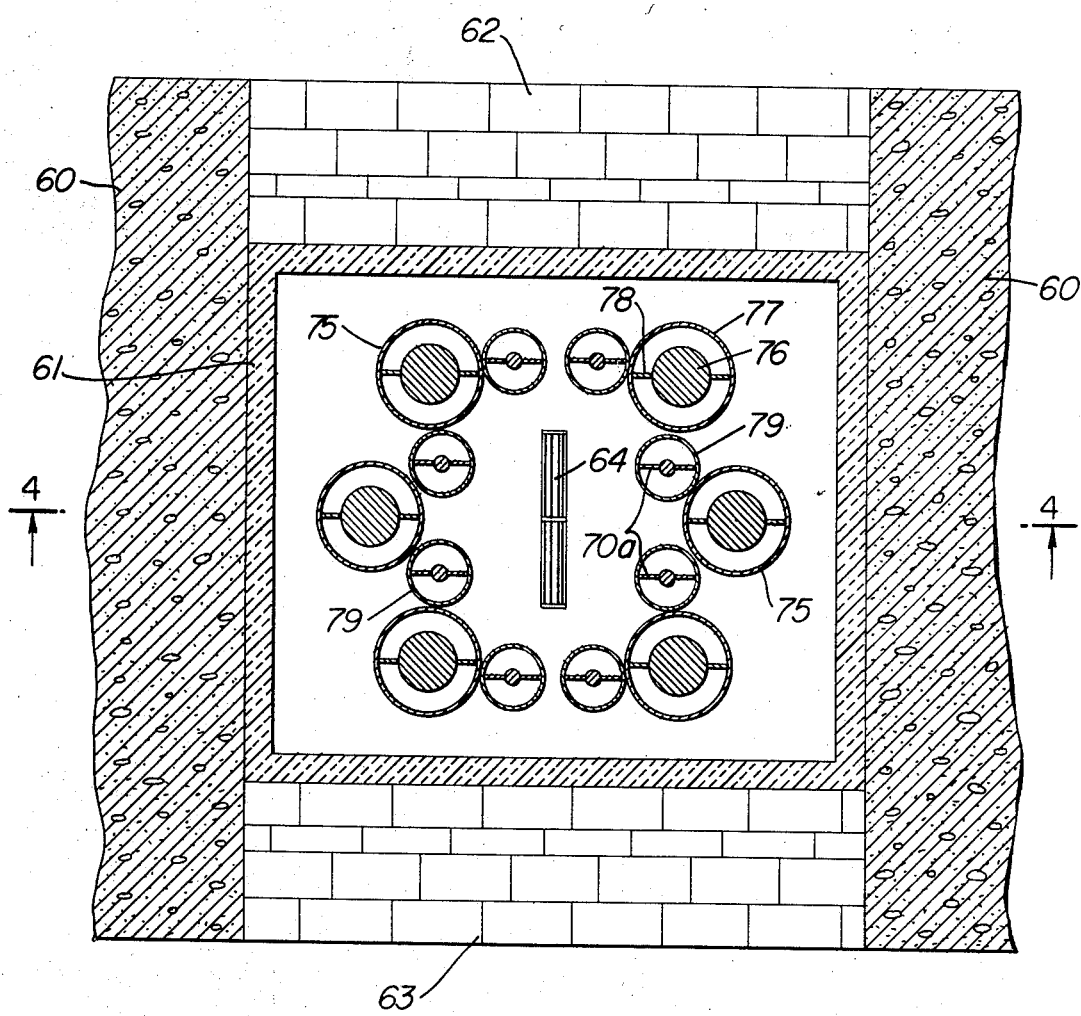

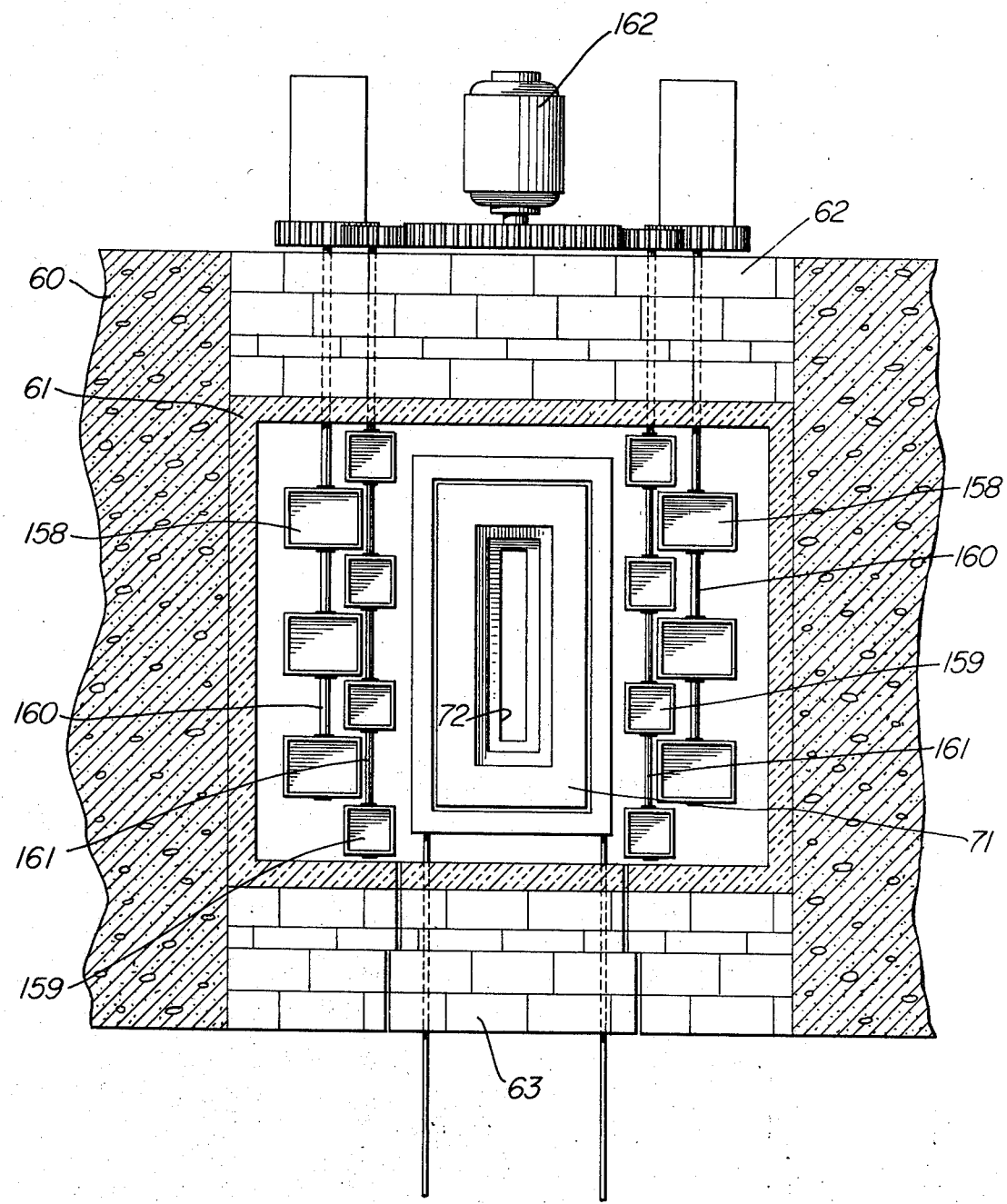

3,527,940
METHOD AND APPARATUS FOR IRRADIATING FLUENT MATERIALS THROUGH A HELICAL PATH
Pierre Balanca, Neuilly-sur-Seine, Claudette Bernard, Colombes, and Jean Taponier, Asnieres, France, assignors to Saint-Gobain Techniques Nouvelles, Courbevoie, France
Filed Feb. 23, 1966, Ser. No. 529,307
Claims priority, application France, Feb. 26, 1965, 7,161
Int. Cl. G21h 5/00
U.S. Cl. 250—44            13 Claims

ABSTRACT OF THE DISCLOSURE

The irradiation of particulate material and liquids has been irregular. Substantial uniformity of exposure is achieved by flowing the material at uniform speed in a spiral path past a source of irradiation. Several forms of novel apparatus are described for carrying out the process.

---

This invention relates to the irradiation of fluids, within the meaning of which we include materials in any state which will flow. The invention is particularly directed to the irradiation of a flowing stream of granular particles and the invention will be described in relation to that particular use.

It has heretofore been proposed to irradiate particulate solids by flowing them through a shielded enclosure designed to eliminate the escape of radiation, but such structures have involved heavy shields and massive construction, resulting in high cost and immobility of the apparatus. In such prior art apparatus the movement of the particulate solids through the radiation zone did not produce uniformity of treatment as parts of the mass undergoing treatment would be more remote from the source of radiation than other parts while some particles would be blocked from exposure by the interposition of other particles. Those processes produced heterogeneous products varying from particle to particle in the dosage received.

A substantial problem has existed in the prior art relating to the transportation to and emplacement of radioactive materials in radiators. Another problem not solved by the prior art was to produce uniformity of flow of particulate solids through a radiant zone. These problems of the prior art were particularly evident when living materials such as seed for planting were to be irradiated. The present invention is particularly applicable to that use because it provides a control of dosage of which prior art apparatus and methods were incapable and which consequently permits the irradiation of seed under conditions which prevent damage to the life-forces therewithin.

It is an object of the invention to irradiate particulate materials evenly. Another object is to irradiate particulate materials evenly in a field of radiation of unequal intensity. Another object is to provide shielded apparatus for the irradiation of streams of material, especially streams of particulate material. Another object is to provide for the safe transportation to and emplacement of radioactive materials in such apparatus. Another object is to control the flow of particulate materials through tubes and to provide sufficient uniformity of flow to produce uniformity of exposure of the particles to the radiation. Other objects are to irradiate fluid materials with ionizing radiation, to irradiate them in continuous flow, and to provide apparatus for irradiation, shielding, and flow control. Other objects will be apparent from the accompanying description. Another object is to irradiate grain and seed and other products of agriculture. Another object is to determine the dosage received by particles passing through the field of radiation.

The objects of the invention are accomplished generally speaking by the method of irradiating a particulate material which comprises establishing a spiral column of the particulate material and moving the column spirally past a source of radiation and through and out of the field thereof; and by apparatus for the irradiation of a particulate material comprising a source of radiation, a spiral conduit of material transparent to the radiation passing through the field and at one side of the source thereof, means to fill the conduit with particulate material, and means to control the flow of particulate material through the conduit.

This novel process and apparatus secures a sufficiently uniform dosage, in a short time, with a high yield which permits economic exploitation. The apparatus used is of less weight than that previously employed for like powers of radiation. The apparatus is light enough to be mobile. According to the invention the material to be irradiated flows through tubular conduits disposed vertically around a source of ionizing radiation, the source, the conduits, and any essential auxiliary, being enclosed within a shielded container. The conduits are helical and beside the source, and so constructed that any cross section of the grains in the conduit will make at least one complete turn around the axis of the helix while it is being subjected to irradiation. This provides good uniformity of treatment for all parts of the flowing mass, whatever may have been the position of its parts as it entered the radiation chamber. A plurality of these conduits encircle the source of radiation so that there are no gaps through which radiation can pass to be wasted in the shield. This is accomplished either by placing the conduits in contact tangentially one with another, so that they interrupt all rays directed upon them, or by arranging them in a plurality of groups which mask the intervals between them. It is frequently advantageous to provide different groups of conduits with different diameters and to arrange them at different distances from the source.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

In the drawings, wherein like reference characters refer to like parts throughout the several views, FIG. 1 is a vertical axial section through a radiator of novel type some parts of which are diagrammatically displayed;

FIG. 2 is a horizontal section on the line 2—2 of FIG. 1;

FIG. 3, a–d, illustrate the apparatus cooperative with the radiator for charging the radiator with radiant material. FIG. 3a is a vertical section showing the radiant material in its shielded carrier. FIG. 3b is similar, showing the carrier emplaced on the radiator. FIG. 3c is similar, showing the radiant material being emplaced in the radiator. FIG. 3d is similar, showing the final stage before the removal of the carrier;

FIG. 4 is a vertical sectional view through a modification taken on line 4—4 of FIG. 5;

FIG. 5 is a section on the line 5—5 of FIG. 4;

FIG. 6 is a horizontal section on the line 6—6 of FIG. 4; and

FIG. 7 is a diagrammatic view of the apparatus indicated by numerals 158, 159 of FIG. 4.

The radiator is an elongated, shielded container the walls 1 of which are of lead, lined with stronger metal. The container is cylindrical with conical apertured ends. Within this chamber is a central vertical tube 2, made of material transparent to radiation, such as glass, which is mounted at its lower end within a shield or plug seat 3 which provides it with a circular seat on a flange 4. A shield or plug 5 closes the aperture in the seat 3 and absorbs any radiation which proceeds downward from the tubes 6, which are filled with radioactive material, and which encircle the axis of the tube 2. The lower radiant tubes 6 are supported by circular plates 7, 8, the middle range of radiant tubes are supported by the circular plates 8, 9, and the upper range is supported by plates 9, 10. A circular shield or plug seat 11 encircles the upper end of tube 2 and a shield or plug 12 covers it, preventing the escape of radiation upward. A pin 13 is attached to shield 5 and plate 7, passes through shield 12 and supports the distributor 14, which receives granular material 15 from hopper 16 and delivers it to six tubular conduits 17 which are joined at their lower ends to the upper ends of six vertical cylinders 18 made of material transparent to radiation, the inner arcs of which closely approach or are tangent to the tube 2. The bottoms of tubes 18 are closed by a rotary valve 19, which has a single tubular outlet 20 which is of the same size as the outlets 21 in the bottoms of tubes 18. The outlet tube 20 communicates with a discharge member 22, the granules from which may be packaged or, when weighed quantities are to be conveyed elsewhere, may be directed into pan 23 of a scale 24 which automatically unloads upon a conveyor 25 when a selected weight has been received. Such scales are known.

The discharge element 22 is fixed to the rotary valve 19 and both are driven by a motor 26, either continuously or intermittently, as desired. When intermittent operation is contemplated favorable results are attained by supplying a motor 26 with a number of impulses in each revolution which is double the number of tubes 18. Thus, applying the principle to FIG. 2, and assuming that the opening 20 at the start of the cycle is directly beneath tube 18' so that the motion of the valve, when observed from above, is clockwise, the first impulse would move the discharge tube 20 to a position beneath 18' and adjacent 18, the next impulse would bring it fully beneath the tube 18, and so on. Thus, for a period of time each tube would discharge alone, then in combination with the adjacent tube, and not again until the cycle of the valve has been completed. This apparatus can be operated at any chosen tempo to give any chosen dose to the particles in the vertical tube.

Each tube 18 is provided with a helical vane 27 which surrounds an axial post 28. The helix is preferably arranged so that at least one full turn is given to the granules as they descend to the point of discharge. The number of turns given to the helix may be arranged as desired. In this way all portions of the grain in the tubes is subjected during exposure to substantially equal dosages of radiation.

The apparatus is supported in elevated position by beams 30 and bracket 31. A conical cover 32 may be placed over the shields 11, 12 to direct the grains from feeder 14 into the vertical tube.

The entire operation is carried on by gravity, the granular material flowing from hopper 16 through feeder 14 into the distributing space above the vertical tubes 18. A super-abundant supply of granular material is always kept available so that the tubes will always be filled beneath a reserve supply. Thus, when, in its cycle, the tube at the left, shown in discharging position, is being discharged, replacement grains will be admitted at the top and will go a full revolution in the helix before discharge. Those portions of the grains most remote from the radiant source when admitted at the top will be closest to it lower in the helix. Furthermore, as the grains flow and settle in the helices there will be some mixing of them which gives additional uniformity of result.

The angle of the helix is calculated so that the product which is to be irradiated follows a course which brings it alternately near and far from the radiant source so that in the end the dose of radiation approximates uniformity for all grains.

According to a variation the tubes with helical vanes may be replaced by helical tubes wound around a central cylinder.

In the prior art, the discharge of the product was continuously effected from all conduits into a single conduit served by an apparatus which gave a variable discharge, but that kind of apparatus produced neither uniform nor good flow of the product in the conduits.

The discharge apparatus which we have provided greatly improves the uniformity of treatment. There are two variables for this discharge valve, the speed of rotation of the element 19 and the duration of its residence in each of its twelve positions. One may, for example, use a low or high ratio of rotation compared to the time of residence, and one may control the flow of product by increasing or reducing the ratio of the period of residence in intermediate positions between two tubes 18, to the period of residence in positions of full discharge from a single tube. One may connect the scale 24 to the motor 26, by means readily comprehensible to persons skilled in motor control, so that the motion of the element 19 will be controlled by the discharging of the pan 23, which will result in exactly equal flow of the materials through all tubes.

The characteristics of the apparatus, as thus far described, are that the circulation of the product is by gravity, an excess of material is always kept above the tubes so that the tubes are always full, the conduits of irradiation are constituted by helical spaces between an exterior cylinder and an interior pin or empty tube, the inlet and outlet are shielded, and the loading of the radiant charge is accomplished in a safe and convenient manner. This will now be described.

It is essential to shield radioactive materials during transportation to protect people from injury and to protect things from contamination. Transportation is usually in containers heavily shielded by lead plates. An additional problem arises when the material is removed from the shield to be placed in the radiator. The concepts of the present case involve transportation of the radiant material in compact form, transfer to the radiator without unshielding the charge, and rearrangement of the parts of the charge in a more convenient or efficient form to suit the operation. This system is shown in FIGS. 3a to 3d.

The carrier 40 is of lead or other shield material, strengthened by a covering of stronger metal. It is cylindrical with openings 41, 42 at the top and bottom which are undercut to provide annular shoulders 43, 44. A shield plug 45, provided with a conforming shoulder, fits the upper opening and a shield plug 46 fits the lower, the shoulders providing offsets which prevent the escape of rays. The plugs are retained in place or released by pins 47 which extend through wall 40 into the plugs. Attached to the lower face of plug 45 is a disk 48, similar to disk 8 of FIG. 2, in the openings of which the tubes 6 carrying the radiant material are received, about ⅓ of which are fixed to the upper disk, the others being free for longitudinal motion. Three disks 49, 50, 51 are provided at the bottom of the cylinder, disk 51 being attached to the plug 46. Part of the radiant tubes 6 are attached to disk, part to disk 49, and part to disk 51, each tube being free to slide through an aperture provided for it in the other disks.

When the carrier has reached its destination, a radiator 1 which is as yet uncharged, it is seated upon the open top of the radiator as in FIG. 3b and the charging takes place. The radiator has a centrally aligned metal tube 52 fixed to disks 48 and 49 and plug 45. An aperture 53 receives a rod 54 which may be screw threaded at its lower end to receive and attach itself to rod 52. An abutment disk 55 is carried toward the upper end of the rod, at a position which sets the ultimate length of the extended source of radiation. The pin 47 is now withdrawn, freeing plug 46, which descends, elongating the source in a sort of telescopic extension as shown in FIG. 3c, one-third of the radiant tubes being held by disks 48, 49, one-third by disks 49, 50, and one-third by disks 50, 51. The lower tubes in FIG. 3c are shortened for drafting purposes. The disk 55 is now fixed to the plug 45 and the distributor-feeder 14 is fixed to the rod 54 above the plug, the upper pin 47 is withdrawn and the assembly is lowered by an extension 54' until the plug 46 is received in the seat 3, completing the seal protective of the discharge orifice, and the plug 45 is received in shield 11.

The feeder 14 is a lead screw of at least a full turn. The screw feeds by gravity through adequate spiral channels into the six tubular chutes 17, each of which is connected to the top of a tube 18. When the level of grain in a tube 18-17 is full, that tube is no longer fed by the hopper through the feeder, but as soon as the level of grain drops below the feeder 14, grain flows into the tube 17, maintaining its level.

In FIGS. 4-7 there are disclosed a number of modifications which will now be described. In these figures the radiator is rectangular, approximately as high as it is long and includes a rectangular lead shield 61 which is set between masses 60—60 of concrete which surround it on all sides except for gaps left for brick walls 62, 63. The bricks are usefully made of baryte cement in different sizes which, when assembled, overlap all joints. These walls can be torn down to service the apparatus. The radiant source 64 is composed of three panels joined together in overlapping, sliding relationship which can be extended as shown in FIG. 4 or retracted. The panels are suspended from a shield 65 by a suitable cable 66 which passes through a shield 67 which overlies the radiant source and the tubes of exposure 68, 69. The shield 65 blocks the opening, 70, through which the cable passes, and also forms the cover to a carrier 71, which is provided with recesses 72, 72' for the reception of the radiant panels, in their retracted or collapsed position, and shield 65. In servicing the apparatus the carrier, with its shield in place, is passed through an aperture in the wall 61 to a central position therewithin, the shield 65 being attached to the cable. The wall is again sealed and the shield 65 is lifted to its operative position, the panels 64 extending themselves to the limit permitted by their interfitting supports. Such sliding or telescoping connections are known and it has been deemed unnecessary to illustrate them. After the source has served its purpose it is lowered into the carrier 71, which is covered by shield 65 and can be transported at will.

The arrangement of the tubular helices is illustrated in FIGS. 4 and 5. There are preferably two sizes of helix, of which the larger 75 are arranged on opposite sides of the panel and approximately equidistant from its center. These tubes are composed of inner tube 76 and an outer tube 77 between which one or more helices 78 are attached, the pitch of the helix being such as to give as many turns to the granular material as is sufficient to accomplish the selected degree of exposure. The tubes 76, 77 may both be transparent to the radiation emanating from the source.

The gaps between the large helical chamber is filled by smaller tubes 79, which are tangent to the larger tubes and obstruct the passage of radiation through the gaps. The smaller tubes are equipped with internal helices 70a mounted on a central pin. As it is important to achieve equal exposure in the large and in the small tubes the radius of the small tubes may usefully be made approximately equal to the distance between the inner and outer walls of the large tubes. The ends of the panel 64 are shielded and a sufficient number of small tubes are placed approximately opposite its ends to intercept any fugitive rays from the source which are not interrupted by the end shields.

These tubes are filled from a hopper 16 through a tube 80 which has a centrally offset and duly sealed center portion, and which connects to conduits 81, 82 which in turn supply headers 83, 84 which overlie the shield 67. As in the other form of the invention the control of flow is provided by apparatus at the bases of the tubes of treatment. The control mechanism is different from that hereinabove described and constitutes a valuable alternative. In order to obtain a regular flow of product being irradiated in the helical tubes, the product is caused to move so that equal quantities of grain will receive equal treatment in equal periods of time. To obtain this result it is desirable that the conduits shall be constantly full and that the flow through the small and large tubes shall be such as to handle the same quantities of grain in the same times. To achieve this the lower end of each conduit is provided with discharge control means including hoppers 154, 156 the size of which is chosen as a function of the flow. The hoppers are attached to flow control means 158, 159 of the same or different capacity. The control means is rotary and all the controls 158 are attached to one rotatable shaft, on one side of the source, and all the control means 159 are attached to another shaft on the same side of the source. Another such arrangement exists on the other side of the walls and both sets of shafts are run at similar or different rates from a motor 162 of variable speeds. An apparatus of this type may be conceived of as similar in its construction to a water wheel with pockets around its periphery, each pocket accepting its own charge of granules as it passes the discharge orifice of the discharge hopper. By changing the speed of the wheel the rates of discharge can be selected. At the outlet of the hoppers 154, 156 (FIG. 7) is a grid of rectangular section formed from parallel guides 163, 164, 165, 166, 167. These guides comprise sliders of different spacing between which the registers 169, 170, 171, 172 may glide and which permit them, according to their position, to enlarge or reduce the size of the passage open to the irradiated produces in the hopper. The opening control by each of these registers corresponds to a particular wheel of the volumetric measuring device 174 which is beneath it. This wheel is itself composed of secondary wheels mounted on the same shaft, each of which is composed of a plurality of pockets 180 between circumferential flanges 177 and baffles 178. For a given speed of rotation of the shaft 161, each of these wheels measures a selected quantity of grain, the amount of which depends upon the total capacity of the pockets. By an approprite combination and selection of different registers 169–172 a very precise measurement of granular material is achieved and a very fine control of the flow of material through the tubes is produced. Furthermore, by changing the speed of the motor 162, the average value of the quantity of radiation, the dosage, can be varied. The discharged, irradiated product may be disposed upon belt conveyors or handled in any other satisfactory means and taken out of the enclosure through appropriate shields.

In order to permit knowledge and control of the dosage received during the course of treatment, small tubes having diameters on the order of the size of the grains being irradiated, may be disposed inside or outside against the wall of the conduits of treatment. The extremities of these tubes can be brought outside the radiator, similarly to tube 80, and disposed in a helical path identical to that of the helical ramps contained in the conduits. When the radiator is operating, one may admit small dosimeters to these auxiliary tubes, to receive irradiation matching that of the grains undergoing treatment. If the sizes have been properly chosen, the dosimeters will traverse the auxiliary irradiation chamber at the same speed as the product being irradiated, while following a similar path. By measuring the radiant activity of the dosimeters as they leave the radiator one may determine with certitude the dose to which the product is being subjected. This has the advantage of giving an independent measurement for each the conduits, and as each of the conduits is independently controllable, it enables one to achieve equalized flow and dosage, producing a uniformity of product which was heretofore not capable of being achieved.

Another method of dosimetric control is to admit dosimeters of small size, as close as possible to the size of particles undergoing treatment, to the product being irradiated, to separate the dosimeters from the irradiated material at the point of discharge and to determine their radiant activity. This produces a statistical indication of the dose which has been imparted to the material undergoing treatment.

As many apparently widely different embodiments of the present invention may be made without departing from the spirit and scope thereof, it is to be understood that the invention is not limited to the specific embodiments.

What is claimed is:

1. The method of irradiating fluent material comprising establishing a longitudinal, elongated source of radiation extending along a major central axis, and passing fluent material in a plurality of streams, each said stream moving along and helically about a respective one of a plurality of discrete secondary axes parallel with, radially offset from, and disposed about said central axis, said streams conjointly essentially completely surrounding said source of radiation.

2. The method of claim 1, and moving the fluent material in each said stream at a controlled rate along said central axis.

3. The method of claim 2, all said axes being essentially vertical and the rate of progression of said streams each along its own axis is continuously controlled at the bottom thereof, whereby all material which forms the streams are subjected to approximately equal doses of radiation.

4. Apparatus for the irradiation of fluent material, comprising, an elongated source of radiation extending in and along a central main longitudinal axis, a plurality of tubes each having a respective secondary axis essentially parallel with and offset from said central axis, said secondary axes being disposed about said central axis, said tubes conjointly essentially completely surrounding said source of radiation, a plurality of helical vanes each disposed in a respective one of said tubes, to direct material passing through each said tube, in a helical movement, supply means operable to continuously supply material to said tubes, at one end thereof, and means operable to control the rate of flow of material through each said tube.

5. The apparatus of claim 4, said supply means feeding material at a mass/time rate substantially equal to the mass/time rate of withdrawal of material from said tubes, to thereby keep said tubes full, said control means regulating the rate of discharge of the material from the tubes, thus controlling the dosage thereof.

6. The apparatus of claim 5, said tubes including a first series of tubes of larger radius, disposed in spaced relation each to the others about said source of radiation, and a second series of tubes of smaller radius than the tubes of said first series, disposed about said source parallel therewith, each said tube of said second series substantially closing the space between consecutive tubes of said first series.

7. The apparatus of claim 6, each tube of said second series having essentially linear tangential contact with each of a consecutive pair of tubes of said first series.

8. Apparatus according to claim 4, said tubes being transparent to the radiations from said source, a plurality of secondary tubes each mounted within, spaced radially from, and forming a pair with, a respective one of said first-named tubes, each said helical vane being mounted in the space between a respective pair of tubes.

9. The apparatus of claim 4, said source of radiation being in the general form of a planar rectangular panel, said tubes being disposed with their axes parallel with the side edges of said panel.

10. Apparatus for the irradiation of fluent material comprising, a cylindrical container having a central longitudinal axis, a plurality of tubular conduits in said container disposed about said axis in radially-spaced relation with and essentially completely surrounding said axis, means operable to continuously supply fluent material to the conduits at the open upper ends thereof, means within each said conduit to impart helical motion to the material as it passes downwardly in and along each said conduit, radiation means in said container extending in and along said axis, and discharge valve means associated with the lower ends of said conduits and operable regularly to release fluent material from said conduits.

11. The apparatus of claim 10, said discharge valve means comprising a rotary closure member for the lower ends of said conduits, said member having an exit port registrable in sequence with each said conduit, in response to rotation of said member, and means to rotate said member.

12. The apparatus of claim 11, said last-named means rotating said closure member in steps to register said port, first with the lower end of one conduit only, then with the lower ends of said one conduit and the next succeeding conduit, then with said next succeeding conduit only, and so on through a complete rotation of said member.

13. In a container for irradiating fluent material, in combination with a transport carrier, said container having a central longitudinal axis, first and second plug seats in said container, spaced along said axis, said carrier being tubular and containing radioactive material for movement into, and for use in said container, first and second plugs removably closing the respective ends of said carrier and normally sealing said radioactive material therein, said carrier having one end sealingly and removable engaging the contiguous end of said container, and means operable to, in succession, (a) lower said first plug into said container along said axis, to rest on said first seat therein, (b) move said radioactive material from said carrier into said container, and (c) move said second plug along said axis into said container, to rest on said second seat therein, said plugs supporting said radioactive material between them, in said container.

References Cited

UNITED STATES PATENTS

| | | | |
|---|---|---|---|
| 1,768,635 | 7/1930 | Schaffner | 250—52 |
| 2,943,203 | 6/1960 | Ritchey. | |
| 3,011,662 | 12/1961 | Daily. | |
| 3,213,280 | 10/1965 | Burley et al. | |
| 1,735,610 | 11/1929 | Goodall et al. | 250—48 X |
| 2,501,290 | 3/1950 | Pequignot | 250—48 |
| 2,885,557 | 5/1959 | Kizaur. | |
| 3,360,646 | 12/1967 | Reiback et al. | 250—44 |

RALPH G. NILSON, Primary Examiner

M. J. FROME, Assistant Examiner

U.S. Cl. X.R.

250—43.5, 48, 52, 84, 106

PO-1050
(5/69)

UNITED STATES PATENT OFFICE
CERTIFICATE OF CORRECTION

Patent No. 3,527,940              Dated September 8, 1970

Inventor(s) PIERRE BALANCA, CLAUDETTE BERNARD, and JEAN TAPONIER

It is certified that error appears in the above-identified patent and that said Letters Patent are hereby corrected as shown below:

Column 1, line 11, after "7,161" insert the following:
-- ; Feb. 2, 1966, 48,067 --.

SIGNED AND
SEALED
DEC 8 - 1970

(SEAL)
Attest:

Edward M. Fletcher, Jr.
Attesting Officer

WILLIAM E. SCHUYLER, JR.
Commissioner of Patents